(12) United States Patent
Tessnow et al.

(10) Patent No.: US 9,103,523 B2
(45) Date of Patent: Aug. 11, 2015

(54) RUNWAY SIGN HAVING A REPLACEABLE SINGLE LED LAMP

(71) Applicants: Thomas Tessnow, Weare, NH (US); Kim Albright, Warner, NH (US); Ronald E. Boyd, Jr., Chichester, NH (US); Aaron Plaza, Canterbury, NH (US)

(72) Inventors: Thomas Tessnow, Weare, NH (US); Kim Albright, Warner, NH (US); Ronald E. Boyd, Jr., Chichester, NH (US); Aaron Plaza, Canterbury, NH (US)

(73) Assignee: OSRAM SYLVANIA Inc., Danvers, MA (US)

( * ) Notice: Subject to any disclaimer, the term of this patent is extended or adjusted under 35 U.S.C. 154(b) by 218 days.

(21) Appl. No.: 13/743,808

(22) Filed: Jan. 17, 2013

(65) Prior Publication Data

US 2014/0198498 A1 Jul. 17, 2014

(51) Int. Cl.
*F21V 5/00* (2015.01)
*F21V 7/00* (2006.01)
*B64F 1/00* (2006.01)
*B64F 1/20* (2006.01)
*F21V 5/04* (2006.01)
*F21W 111/06* (2006.01)
*F21Y 101/02* (2006.01)

(52) U.S. Cl.
CPC ............... *F21V 7/0066* (2013.01); *B64F 1/002* (2013.01); *B64F 1/20* (2013.01); *B64D 2203/00* (2013.01); *F21V 5/00* (2013.01); *F21V 5/04* (2013.01); *F21W 2111/06* (2013.01); *F21Y 2101/02* (2013.01)

(58) Field of Classification Search
CPC ............ F21S 10/023; F21S 4/00; F21S 4/003; F21S 4/008; F21V 13/04; F21V 23/005; F21V 23/009; F21V 5/043; F21V 5/048; F21V 7/0025; F21V 7/005; F21V 7/0058; F21V 7/0091; F21W 2111/06; F21Y 2103/003; G09F 13/02
USPC .......... 362/217.01–225, 217.04, 217.07, 218, 362/220, 223, 224, 249.02, 291, 334, 335, 362/367, 812, 612, 613, 311.01, 311.02
See application file for complete search history.

(56) References Cited

U.S. PATENT DOCUMENTS 4,380,880 A * 4/1983 Gandy ........................... 40/564
4,941,072 A 7/1990 Yasumoto et al.
(Continued)

OTHER PUBLICATIONS

Applicants co-filed application U.S. Appl. No. 13/743,798 for "Replaceable Single LED Lamp for Runway Sign" (Tessnow, Albright, Boyd, Jr., Plaza) filed Jan. 17, 2013, pending before Exmr. James Endo, Office Action issued Oct. 10, 2014.

*Primary Examiner* — Peggy Neils
*Assistant Examiner* — Zheng Song
(74) *Attorney, Agent, or Firm* — Edward S. Podszus (57) ABSTRACT

A two-sided airfield runway sign with direct illumination by a single LED lamp. Light is produced by a linear array of white-light LEDs. A cylindrical lens is mounted longitudinally adjacent to the LEDs, and collects a central portion of the light emitted from the LEDs. A pair of inclined surfaces extend from the lateral edges of the LEDs to respective lateral edges of the cylindrical lens. The inclined surfaces have a rough surface texture and reflect light diffusely. The inclined surfaces collect a peripheral portion of the light emitted from the LEDs, and direct the reflected light toward the cylindrical lens. The LEDs, cylindrical lens and inclined surfaces are all mechanically supported by a heat sink. The replacement lamp is placed into a runway sign near its top or bottom edge, and illuminates both viewing surfaces of the runway sign simultaneously without a diffuser.

19 Claims, 8 Drawing Sheets

(56) References Cited

U.S. PATENT DOCUMENTS

| | | | |
|---|---|---|---|
| 5,729,925 A * | 3/1998 | Prothero | 40/570 |
| 5,735,595 A | 4/1998 | Nederpel et al. | |
| 5,768,814 A * | 6/1998 | Kozek et al. | 40/570 |
| 6,296,376 B1 | 10/2001 | Kondo et al. | |
| 6,946,975 B2 | 9/2005 | Hansler et al. | |
| 7,101,056 B2 | 9/2006 | Pare | |
| 7,303,309 B2 | 12/2007 | Wu et al. | |
| 7,377,062 B2 | 5/2008 | Ellerton | |
| 7,434,964 B1 | 10/2008 | Zheng et al. | |
| 7,461,951 B2 | 12/2008 | Chou et al. | |
| 7,510,299 B2 | 3/2009 | Timmermans et al. | |
| 7,572,029 B2 | 8/2009 | Tsai | |
| 7,618,157 B1 | 11/2009 | Galvez et al. | |
| 7,797,866 B2 | 9/2010 | Swantner et al. | |
| 7,841,733 B2 | 11/2010 | Meulenbelt | |
| 7,926,977 B2 | 4/2011 | Nall et al. | |
| 7,926,985 B2 * | 4/2011 | Teng et al. | 362/373 |
| 8,099,886 B2 | 1/2012 | Ellerton | |
| 8,115,411 B2 | 2/2012 | Shan | |
| 8,123,382 B2 | 2/2012 | Patrick et al. | |
| 2003/0002179 A1 | 1/2003 | Roberts et al. | |
| 2003/0156416 A1 | 8/2003 | Stopa et al. | |
| 2004/0004827 A1 * | 1/2004 | Guest | 362/31 |
| 2005/0090124 A1 * | 4/2005 | Mohacsi et al. | 439/35 |
| 2006/0072314 A1 * | 4/2006 | Rains | 362/231 |
| 2006/0138437 A1 | 6/2006 | Huang et al. | |
| 2006/0146531 A1 * | 7/2006 | Reo et al. | 362/244 |
| 2006/0291241 A1 * | 12/2006 | Wojtowicz et al. | 362/604 |
| 2008/0151536 A1 * | 6/2008 | Hess | 362/224 |
| 2009/0261706 A1 | 10/2009 | Sorella et al. | |
| 2010/0020542 A1 | 1/2010 | Teng et al. | |
| 2010/0265693 A1 | 10/2010 | Ryu et al. | |
| 2011/0131849 A1 * | 6/2011 | Sato et al. | 40/564 |
| 2011/0149548 A1 | 6/2011 | Yang et al. | |
| 2011/0255291 A1 * | 10/2011 | Seki et al. | 362/297 |
| 2011/0317413 A1 | 12/2011 | Lee | |
| 2012/0002423 A1 | 1/2012 | Li et al. | |
| 2012/0014107 A1 | 1/2012 | Avila | |
| 2012/0051039 A1 | 3/2012 | Chang | |
| 2012/0092876 A1 | 4/2012 | Chang et al. | |
| 2012/0155071 A1 * | 6/2012 | Sato et al. | 362/217.05 |
| 2012/0155091 A1 * | 6/2012 | Takatori | 362/308 |
| 2012/0155095 A1 | 6/2012 | Ryan, Jr. | |
| 2012/0201023 A1 | 8/2012 | Yoneda | |
| 2012/0275150 A1 | 11/2012 | Yokotani et al. | |
| 2013/0092418 A1 * | 4/2013 | Shih et al. | 174/250 |
| 2013/0128559 A1 * | 5/2013 | Glanz et al. | 362/147 |
| 2013/0258656 A1 | 10/2013 | Chin | |
| 2014/0140051 A1 * | 5/2014 | Takatori | 362/224 |

* cited by examiner

RUNWAY SIGN HAVING A REPLACEABLE SINGLE LED LAMP

TECHNICAL FIELD

The present disclosure relates to signs found adjacent to airport runways.

BACKGROUND

The signs that appear adjacent to airport runways are subject to particular government regulations. For instance, there are regulations regarding the size of the signs and particular characteristics of the light emitted by the sign. In particular, there are regulations regarding the homogeneity of the emitted light, so that "hot spots" in the sign brightness are reduced or eliminated. These regulations are published by the Federal Aviation Administration, and an example of a specification regarding these signs is a published document with the name "FAA AC 150/5345-44J". An example of a requirement from this document is that particular styles of runway sign "must have an average luminance of 10 to 30 foot lamberts (fL)".

A typical two-sided runway sign is lit from its interior. Typically, the sign has two fluorescent bulbs or two remote phosphor LED lamps of the type shown in U.S. Pat. No. 7,618,157, one along its top edge and one along its bottom edge. For simplicity, the remainder of this document refers to fluorescent lamps, since they have been predominantly used in the field. The light emitted from these lamps has a relatively broad distribution in angle, and the sign relies on one or more diffusers within the interior of the sign to redistribute the light so that the hot spots nearest the lamps are sufficiently dampened. The diffusers randomize and redistribute the light in order to make the sign appear more uniform in brightness. These existing fluorescent lamps are typically connected electrically and supported mechanically by conventional tombstone-style connectors. Conventional runway signs are depicted in U.S. Pat. No. 8,099,886 (Ellerton), U.S. Pat. No. 7,377,062 (Ellerton), and U.S. Pat. No. 6,946,975 (Hansler et al.).

In recent years, there has been an effort to retrofit existing runway signs with new interior optics that use light emitting diodes (LEDs) as their light sources, which use less energy and have longer lifetimes than their fluorescent counterparts. See, for example, U.S. Pat. No. 7,618,157 (Galvez et al). The lamp discussed in Galvez uses blue LEDs that emit light toward a remote phosphor, which is located away from the blue LEDs on a cover of the lamp. The phosphor absorbs a portion of the blue light and emits yellow or yellow-green light, so that the combination of the non-absorbed blue light and the emitted yellow or yellow-green light appears white. Note that the phosphor shown in FIGS. 1 and 2 of Galvez absorbs the incident blue light from any incident direction, but radiates the yellow light or yellow-green light isotropically into all directions.

Other known LED-based light elements and sub-systems are discussed in FIGS. 1 and 2 of U.S. Patent Application Publication No. 2009/0261706 (Sorella et al.), FIGS. 3 and 8 of U.S. Pat. No. 7,461,951 (Chou et al.), FIGS. 40a and 40d of U.S. Patent Application Publication No. 2003/0002179 (Roberts et al.), U.S. Patent Application Publication No. 2012/0155095 (Ryan Jr.), U.S. Pat. No. 7,572,029 (Tsai), and U.S. Pat. No. 6,296,376 (Kondo).

SUMMARY

An embodiment is a two-sided airport runway sign. The runway sign includes a rectangular, translucent front face. The runway sign also includes a rectangular, translucent rear face generally parallel to the front face and longitudinally separated from the front face by first and second longitudinal edges. The front and rear faces and the first and second longitudinal edges bound an interior volume of the runway sign. The runway sign also includes a single LED lamp being electrically energized in operational use. The LED lamp is disposed proximate the first longitudinal edge of the interior volume. The LED lamp is selectively removable from and replaceable into the runway sign. The LED lamp has a plurality of spaced LEDs. The energized LED lamp provides direct illumination to both the front and rear faces simultaneously. The interior volume is devoid of a diffuser optically adjacent the LED lamp.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION OF PREFERRED EMBODIMENTS INCLUDING BEST MODE

Because the signs adjacent to airport runways are oriented vertically, with viewable faces that are vertical, it is beneficial to establish a convention for describing the various orientations and directions encountered in this document. Note that the term "vertical" is relatively clear in referring to the direction perpendicular to the ground, or "up". We will use the terms "lateral" to denote the "left"-to-"right" direction, which is parallel to the top edge of the sign and parallel to the ground, and "forward" to denote the direction perpendicular to the viewable faces of the sign and parallel to the ground. In the drawings, the directions of lateral, forward and vertical are denoted by the shorthand labels of X, Y and Z. It is understood that the terms lateral, forward and vertical describe orientations and directions not only when the sign is in use, but may also be used for convenience to describe the relative orientations of elements with respect to each other even when the sign is uninstalled, is inactive on a shelf or is in shipment.

Similarly, the term "generally" is used in this document to denote a typical direction, or a direction that is a combination of an intended direction with a slight misalignment caused by typical manufacturing, alignment or assembly tolerances.

A typical full light is implemented as a sign beside an airport runway. The sign usually includes a light source in its interior, has generally translucent front and back faces for viewing, and typically includes a short series of letters, numbers and/or symbols that are relevant to pilots in aircraft that taxi on the runway. The indicia on the sign are usually the same on both sides. The sign is generally in the shape of a parallelepiped.

Figure 8:
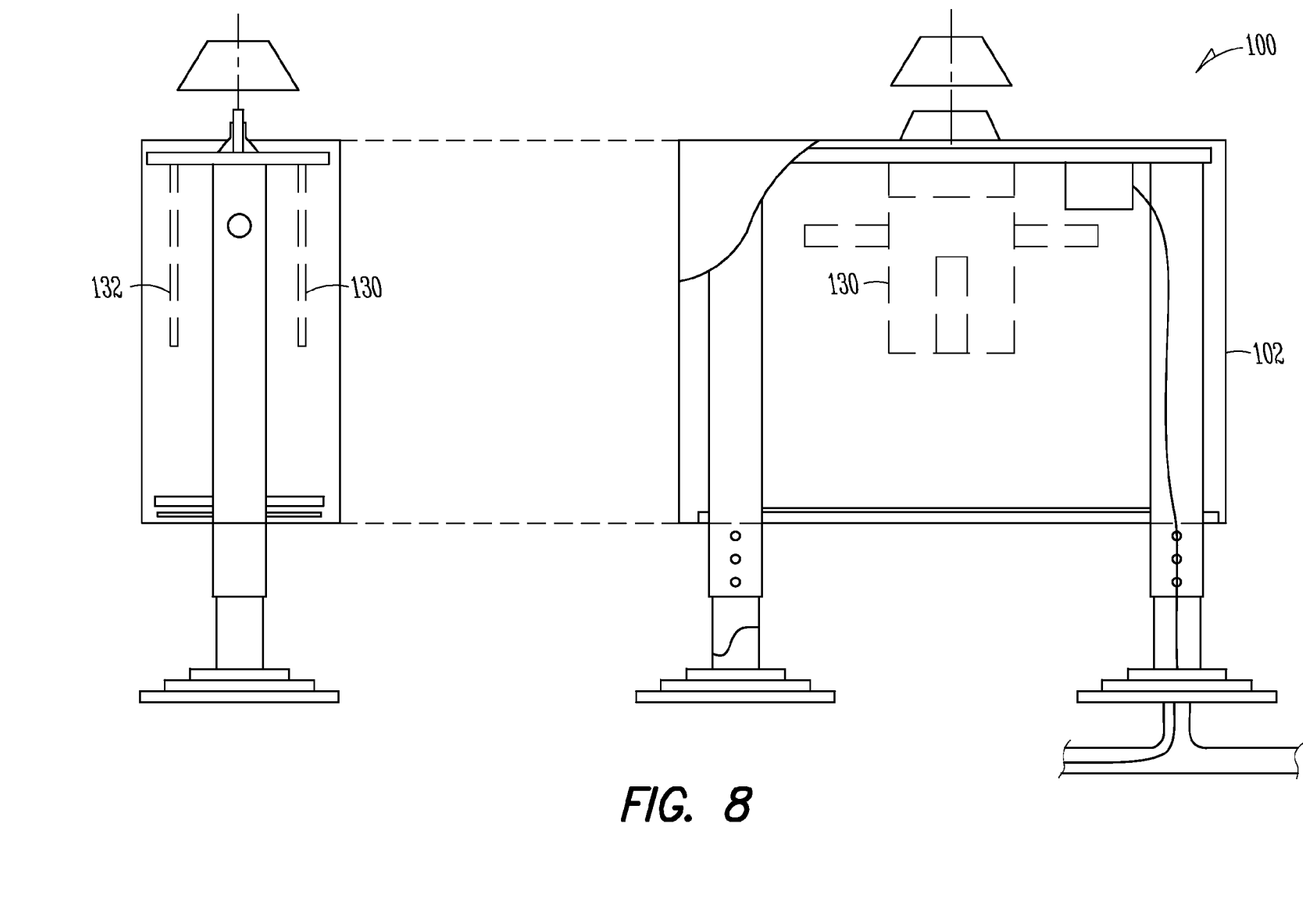
FIG. 8 is an isometric drawing of a of an existing runway sign.

See, for example, FIG. 8, which includes a known runway sign 100 of the type discussed in U.S. Pat. No. 6,946,975 (Hansler). The sign 100 includes a case 102 and a pair of diffusers 130 and 132 (drawn with a dashed line) adjacent the light source and which receive light from the light source.

A trend in many lighting or illumination applications is to use light emitting diodes (LEDs) as the light sources. Compared with most incandescent and fluorescent light sources, LEDs are more efficient, produce less heat, and have longer lifetimes. In particular, for cold-weather outdoor applications, LEDs operate significantly more efficiently than their incandescent or fluorescent counterparts. At the temperature drops, the efficiency of a typical LED increases, while the efficiency of a comparable fluorescent light decreases. In addition, LEDs are less subject to breakage from vibration and being hit by snowplows on runways.

In keeping with the trend toward LEDs, there is a desire to retrofit existing runway signs, many of which currently use fluorescent lamps in their interiors, with LED light sources. A single lamp of the LED-based system discussed herein is suitable for such a retrofit.

There are well-known government regulations on the size, shape and brightness distribution for these signs. These regulations dictate that only a relatively small number of permutations exist for particular sizes and aspect ratios. Most or all of the signs are rectangular in shape, with a top edge that is parallel to the runway and to the ground, and a bottom edge that is close to or level with the ground. Because so few variations are allowed for the runway signs, it becomes relatively straightforward to envision a relatively small number of retrofitting modules, which can replace the older fluorescent or incandescent lamps inside the signs.

For a retrofit, one would first open a runway sign to gain access to the interior of the sign. One would then remove all the fluorescent lamps from the top edge and/or bottom edge of the runway sign. Typically, these lamps are elongated fluorescent tubes with electrical pins at their ends, which couple to respective pairs of so-called "tombstone" connectors. The fluorescent tubes are removed by first pivoting them about their elongated axes until the pins align with a channel in the connector, then pulling them out of the channels at the "tops" of the "tombstones". New tubes are engaged with the tombstone connectors by inserting the pins through the tombstone channels, then pivoting the tubes about their elongated axes.

One would also remove any diffusers from the interior of the runway sign. Diffusers of the type known in U.S. Pat. No. 6,946,975 (Hansler) (elements 130, 132) are shown as dashed elements 130 and 132 in FIG. 8. Note that these diffusers are spaced apart from the front and rear faces of the sign, and are located within the sign. Note also the diffusers are not reinstalled. Here, reinstalling the removed diffuser is intended to mean putting the diffuser back in its operative position. For example, if the diffusers are removed, then are thrown into the bottom of the sign, they are not considered to be reinstalled. Similarly, if the diffuser are removed, then are placed in a position where they are not optically adjacent to the LED lamp, then they are not considered to be reinstalled. The phrase optically adjacent to the LED lamp is intended to mean that when the LED lamp is operational, then light from the LED lamp strikes the diffuser.

Note that if the retrofit LED lamp is to be installed at the top edge of the runway sign, then any fluorescent lamps at the bottom of the runway sign are removed. Likewise, if the retrofit LED lamp is to be installed at the bottom edge of the runway sign, then any fluorescent lamps at the top of the runway sign are removed. It is envisioned that all existing lamps should be removed from the sign before installing the single LED lamp discussed herein, since that is the only lamp necessary for operation. It is envisioned that for some cases, the LED-based replacement lamp uses one set of electrical connections in the lamp and leaves the other set of connectors unused in the runway sign. The unused connectors may be left in place or may be removed.

Once the upper and/or lower fluorescent lamps have been removed, one may secure a single LED lamp in a pair of existing tombstone connectors at or near the top edge or bottom edge of the runway sign. Once the LED lamp is secured, one closes the runway sign, energizes the LED lamp through the upper tombstone connectors, and operates the runway sign to guide aircraft on the runway.

In addition to having a relatively high efficiency, a relatively low heat output, and a relatively long lifetime, the retrofit LED lamp also simplifies lamp replacement, since it uses only one set of electrical sockets in the runway sign.

In the preceding paragraphs, it is assumed that the LED lamp may be a direct replacement for one of the fluorescent lamps, and may use the same electrical and mechanical connections as the fluorescent lamp. As an alternative, the ballast and electrical sockets for the fluorescent lamps may also be removed, and one or more new mounting brackets may be installed for the replacement LED lamp. The LED lamp may use a ballast that is built into the lamp, or may use an external ballast that is installed along with the new mounting bracket in the runway sign. In all cases, it is assumed that the fluorescent or incandescent system that is removed uses two or more fluorescent or incandescent lamps, and that the LED system that is installed uses only a single LED lamp 1.

When mounted and operational, a single LED lamp adequately illuminates the full sign, compared with the use of two fluorescent lamps or two remote phosphor LED retrofit lamps of the type shown in U.S. Pat. No. 7,618,157 (Galvez et al) that the single LED lamp replaces. (It is contemplated that in the prior art, there could have been a mix-and-match of lamp styles, with a fluorescent lamp along one edge, and a retrofit remote phosphor LED lamp on the opposing edge. This mix-and-configuration is also replaced by the single LED lamp discussed herein.)

In addition, light from the single LED lamp illuminates the front and rear display panels of the sign directly, with no intermediate optical interactions (such as refraction, reflection or scattering) after the LED lamp and before arrival at the display panels to be illuminated.

It will be understood that the LED lamp may be installed at the top or the bottom edge of the sign, and that the geometries shown in the figures may alternatively be applied in a top-to-bottom inverted manner. The following discussion assumes that the lamp is installed at the top, for convenience.

For an LED lamp mounted near the top edge of the sign, the LED lamp output is angled slightly away from truly downward, and is directed largely toward the front and rear faces of the runway sign. These front and rear faces are each be displaced away from the center of the sign by half the thickness of the sign, and each extend downward from the lamp, toward the ground. As a result, the optics of the lamp are designed to direct as much light as possible toward these front and rear faces, while minimizing the light that would miss the front and rear faces. For a typical design, about 80% of the LED lamp output strikes the front and rear faces, while only about 20% misses the front and rear faces. This light distribution is referred to in this document as "largely" downward. Light traveling truly downward is reduced, since it would strike the bottom of the runway sign and be partially wasted. Light in an angular range a few degrees away from true downward is enhanced, since this represents light that strikes the front and rear faces of the runway sign. For an LED lamp mounted near the bottom edge of the sign, the LED lamp output is similarly referred to as "largely" upward.

The front and rear faces of the runway sign are referred to as diffusing or diffusive. In general, light that strikes one of these faces generally transmits through the face, but has its direction of propagation "scrambled" in a random manner. The degree of "scrambling" is related to a measure of how diffusive the respective face is. In general, such "scrambling" is beneficial for the translucent front and rear faces of the runway sign, so that the information on the sign is visible over a relatively large range of incident angles. In other words, the higher the diffusivity of the front and back faces, the lower the angular dependence of the output of the runway sign, and the more omnidirectional the runway sign appears.

The single LED lamp includes several spaced-apart LEDs along its length. The LEDs are preferably white-light emitting LEDs, so that any reflective surfaces 3 or refractive surfaces (lens 4) in the lamp are devoid of any wavelength conversion material, such as a phosphor.

The light output from the LEDs is informally categorized into a central portion, which surrounds a surface normal to the LEDs, and a peripheral portion, which extends from the central portion out to a relatively high angle of propagation with respect to the surface normal. Light in the central portion directly strikes a cylindrical lens. Light in the peripheral portion strikes a diffuse reflecting surface that extends from near a lateral edge of the LEDs to near a lateral edge of the cylindrical lens. Light reflected from the diffuse reflecting surface also strikes the cylindrical lens. The output from the cylindrical lens includes both the central and the peripheral portions of the light output from the LEDs. It is this output from the cylindrical lens that is "largely" downward, and this output is directed onto the translucent, diffusive front and rear faces of the runway sign. The light output is discussed in more detail below.

The above paragraphs are merely a generalization of several of the elements and features described in detail below, and should not be construed as limiting in any way. Next, the specific optical elements and the optical path are discussed. Note that the figures show only one example configuration for the elements in the replacement lamp and the sign, although other suitable configurations are contemplated.

For the remainder of this document, it is assumed that the LED lamp is installed at the top edge of the sign. The text and figures show the geometry for such a case. It will be understood that the LED lamp may alternatively be installed at the bottom edge of the sign, and that the geometries shown in the figures may alternatively be applied in a top-to-bottom inverted manner.

Figure 1:
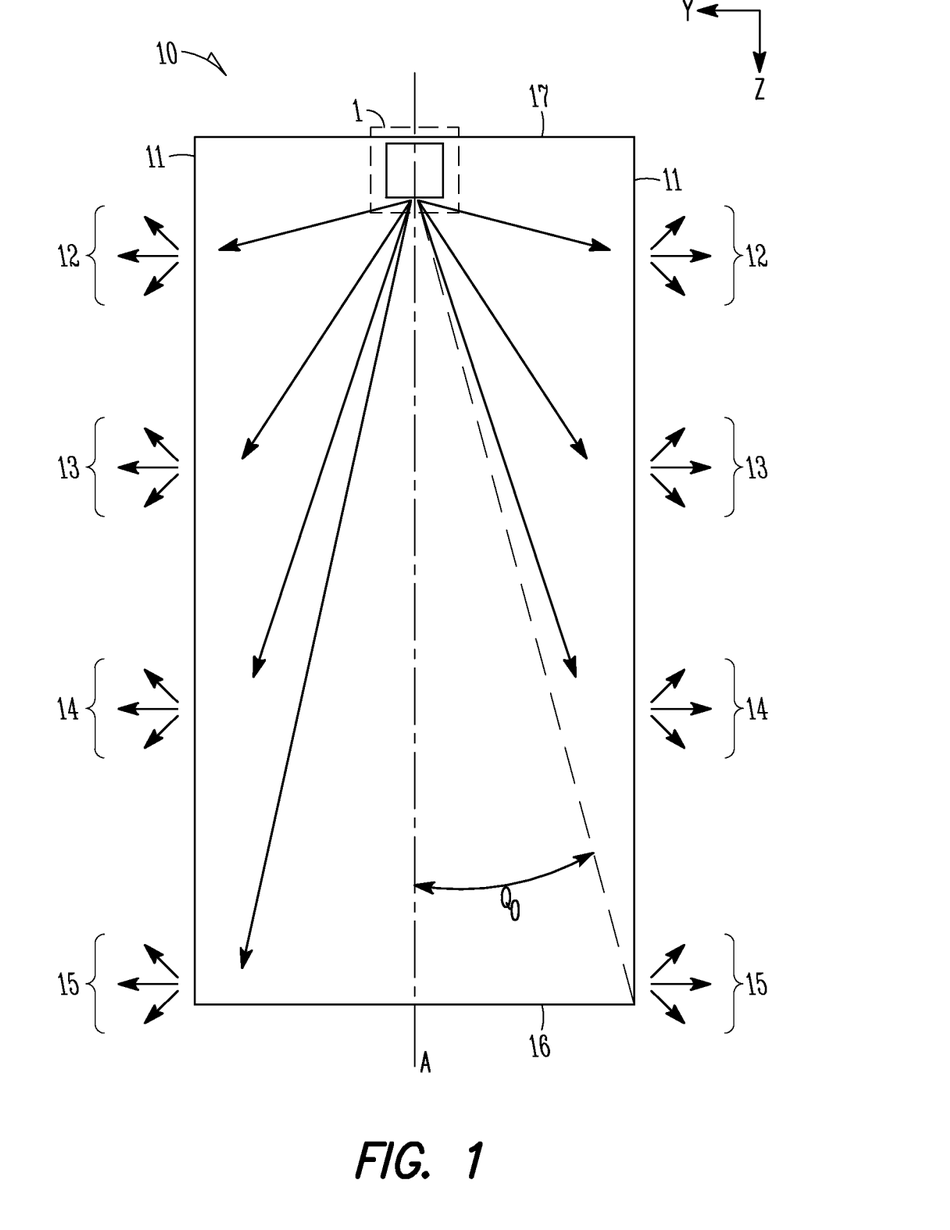
FIG. 1 is a side-view drawing of a replacement lamp installed in an exemplary runway sign.

FIG. 1 shows a retrofit, LED-based lamp 1, as installed in a runway sign 10. In use, the lamp 1 emits light largely downward with a prescribed angular distribution, so that the front and back faces 11 of the sign 10 simultaneously receive a generally uniform amount of power per area. Due to the geometry of the sign 10, this involves directing relatively little light to the tops of the front and back faces 11, and directing a relatively large amount of light toward the bottoms of the front and back faces 11.

For convenience, an angle, noted as $Q_0$, is formed between the longitudinal axis (A) and a line connecting the lamp 1 with a far corner of the front and/or rear face 11. This angle is the propagation angle at which light leaving the lamp 1 exits in order to strike the front and/or rear face 11 at or near the bottom edge of the respective face 11. In general, it is desirable that the emitted light intensity from the source (in power per angle) have a peak at or near angle $Q_0$. In the example shown herein, angle $Q_0$ is about four degrees. In some cases, the peak may be set at a value slightly less than angle $Q_0$, in order to allow for manufacturing, alignment and assembly tolerances; if the peak as designed falls slightly below the bottom edge of the front and/or back face 11, then the full face receives illumination even if the peak moves up or down due to tolerances.

The design of the lamp 1 attempts to reduce or minimize the amount of light that propagates directly downward inside the sign 10, because the truly downward-propagating light misses the front and back faces 11 entirely and strikes the bottom edge 16 of the sign 10, thereby becoming wasted. In terms of the geometry of FIG. 1, the light propagating from the lamp 1 between propagation angles $+Q_0$ and $-Q_0$ is reduced by as much as is practical. For similar reasons, the design of the lamp 1 also reduces or minimizes the amount of light that strikes the top edge 17 of the sign 10. In general, the design directs as much light as is practical toward the front and back faces 11 of the sign 10, while directing as little light as is practical toward the longitudinal edges 16, 17 of the sign 10.

Using the language of proximal to indicate nearness to the lamp 1 and distal to indicate a larger distance away from the lamp 1, FIG. 1 shows regions 12, 13, 14, and 15 of the front and back faces 11 as being increasingly distal and decreasingly proximal. The design of the lamp 1 directs more light to the distal regions and less to the proximal regions. Most of the light is directed to the translucent front and back faces 11, with only a minority of the light being directed to a non-translucent bottom panel at or near the bottom edge 16 of the sign 10.

Figure 2:
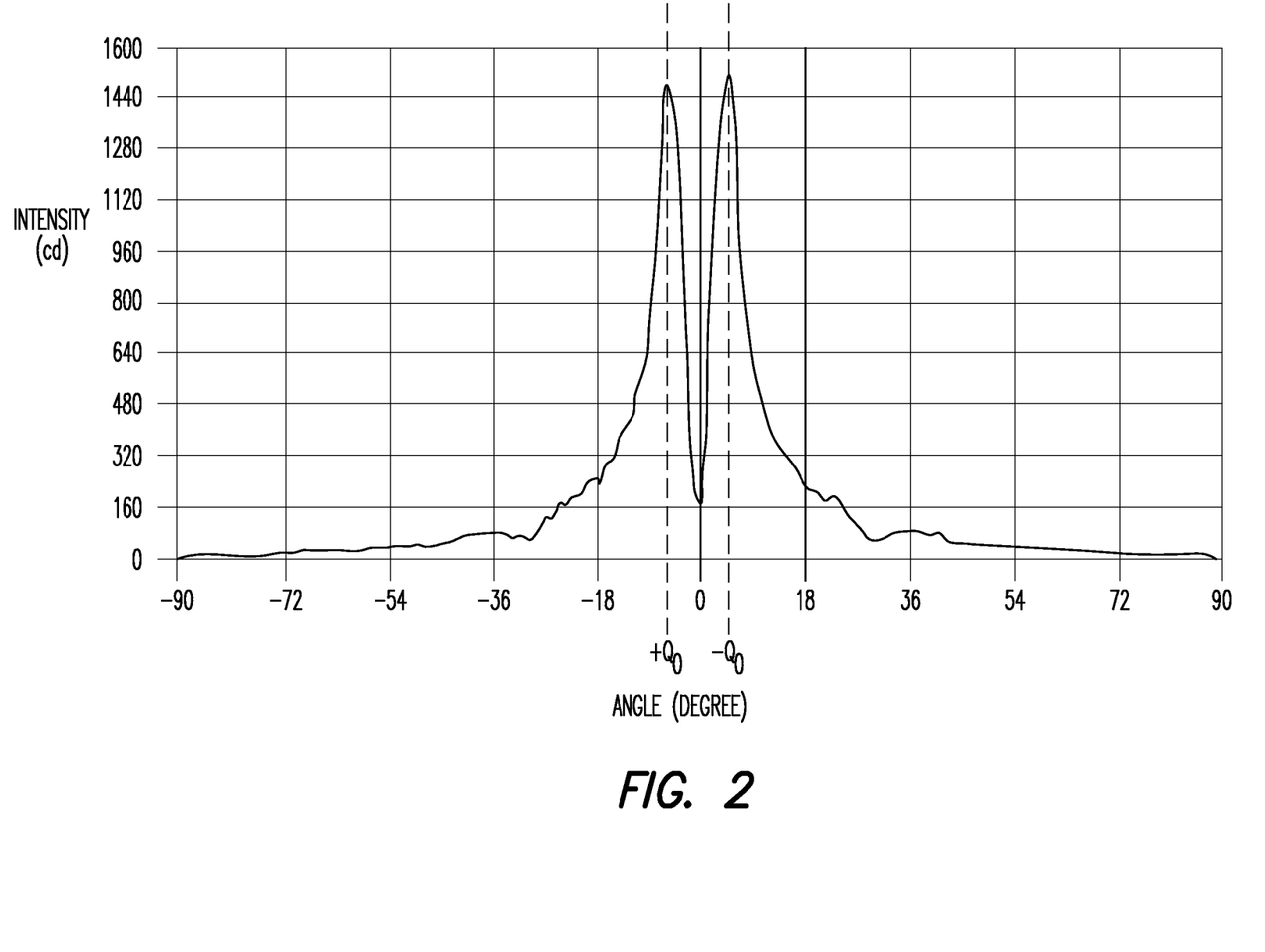
FIG. 2 is a plot of the calculated angular performance of an exemplary replacement lamp, based on statistical simulation.

FIG. 2 shows a calculated performance curve of intensity versus angle leaving the lamp 1. Simulations were performed with ASAP, which is computer aided designing software that is well suited for lighting design tasks. ASAP is commercially available from Breault Research Organization, Inc. in Tucson, Ariz. It is understood that any suitable ray-tracing software may also be used for the simulation of performance, and the adjustment of various system parameters to optimize performance.

The simulated curve of FIG. 2 shows relatively sharp peaks at propagation angles $+Q_0$ and $-Q_0$ of plus and minus four degrees, which corresponds roughly to the distalmost (bottom) regions of the front and back faces 11. The curves show slight fluctuations with propagation angle as a result of typical statistical processes in the software.

The curve of FIG. 2 falls off monotonically for angles greater than the plus and minus four degree peaks up to about plus and minus fifteen degrees, which correspond to the more proximal (upper) regions of the front and back faces 11 of the lamp 1.

The curve of FIG. 2 also dips in the angular region between the peaks at plus and minus four degrees, which is a relatively small angular region surrounding the longitudinal axis A from the lamp 1. In this central angular region, the light misses the front and back faces 11 entirely and strikes the bottom edge 16 of the sign 10. This light is fully or partially wasted, so the intensity at these central angles is reduced or minimized as much as possible.

Note that the peaks at four degrees correspond to one of the allowed variations (e.g., size) of the sign 10. Specifically, the angles of plus and minus four degrees direct light from the lamp 1 to roughly the bottom edges of the front and back faces 11 of the sign 10. It will be understood that for any of the other allowed variations of runway sign 10, the angles of these peaks may be adjusted in a straightforward manner to correspond to the bottom edges of the front and back faces 11 of the sign 10.

It is convenient to have a simple formula that predicts the shape of the decay of the curve of FIG. 2 at high propagation angles. Such a formula is empirically found to be:

$$I(a)=I(Q_0)*(\sin Q_0)^E/(\sin Q)^E$$

where I is the intensity in candelas, Q is the angle of propagation, $Q_0$ is the propagation angle at which the distribution peaks (about four degrees in the present example), and E is a dimensionless exponent that is found to have a value between 1.5 and 3. For the special case of a single LED lamp and no reflective elements inside the lamp 1, E is found to have a value of 3. For the example design considered below, E is found to be 1.6.

Figure 3:
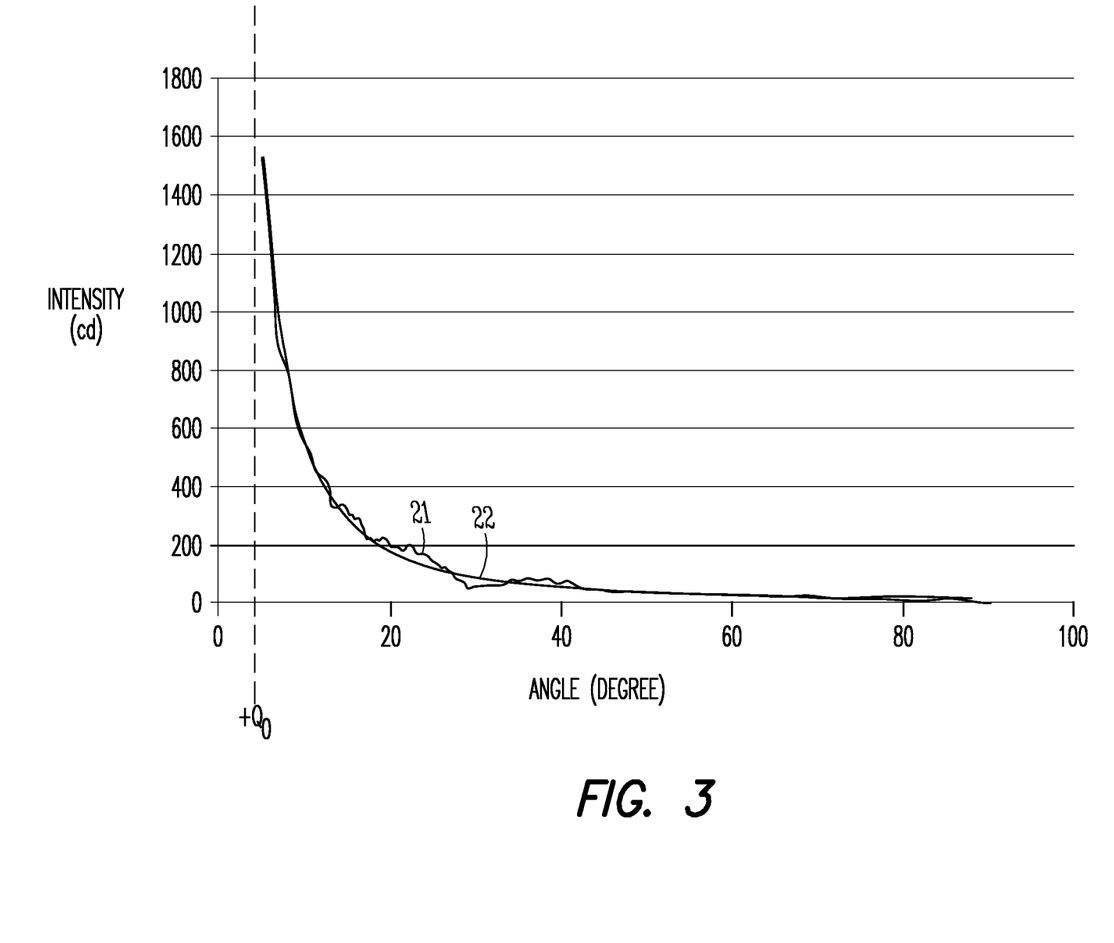
FIG. 3 is a plot of the calculated angular performance of an exemplary replacement lamp, based on an empirical formula.

FIG. 3 is a plot of the high-propagation angle performance of the simulated example, with the rough curve 21 corresponding to the statistical simulation, and the smooth curve 22 corresponding to the formula with E having a value of 1.6. Note that the high-propagation angle performance shows a decrease of intensity with increasing propagation angle Q.

There is another, equivalent, way of quantifying the light distribution. Instead of addressing the issue from the point of view of the emitter, as is done in FIG. 2, we may look at the light distribution from the point of view of the front and back faces 11 of the sign 10. These faces 11 diffuse the transmitted light, so that light always exits with a particular angular distribution, regardless of whatever the incident angle is. As such, we want to ensure that the optical power per unit area, in watts per square meter or other equivalent units, is generally uniform over the whole visible area of the faces 11. Such a uniform distribution ensures that at a particular viewing angle, there is relatively little area that is excessively bright or excessively dark on the faces 11. In general, there are well-defined characterizations for uniformity, which may include peak-to-valley brightness levels, brightness gradients, and similar quantities, all of which are known to one of ordinary skill in the art.

Regulations for the runway signs are published by the Federal Aviation Administration, and an example of a specification regarding these signs is a published document with the name "FAA AC 150/5345-44J". An example of a requirement from this document is that particular styles of runway sign "must have an average luminance of 10 to 30 foot lamberts (fL)".

Note that the document specifies a value of luminance, which is the amount of light emitted from a unit area within a solid (cone) angle. In general, luminance indicates how much power is detected by an eye looking at the surface from a particular viewing angle. Luminance has units of candelas per square meter, where one candela per square meter equals 0.292 foot lamberts.

Typically, one measures values of illuminance, which is the amount of light hitting an area or emitted from an area. Illuminance has units of lux, or lumens per square meter, or candelas times steradians per square meter. If one assumes that the front and rear faces 11 of the sign 10 are Lambertian radiators, which emit into solid (cone) angles of pi steradians, then we can convert luminance values of 10 to 30 fL to illuminance values of about 108 to about 323 lux. For the runway signs 10 discussed herein, the LED lamp 1 delivers average illuminance values between 108 and 323 lux at the front and rear faces 11 of the sign 10.

The lamp 1 of FIG. 1 is shown in cross-section. In practice, the lamp 1 may extend laterally (X) along most or all of the upper edge of the front and rear faces 11. In the present example, the lamp 1 includes a line of spaced-apart LEDs, while the rest of the structure in the lamp 1 for reflecting and/or refracting the LED light is generally uniform along most or all of the length (in X) of the lamp 1.

Figure 4:
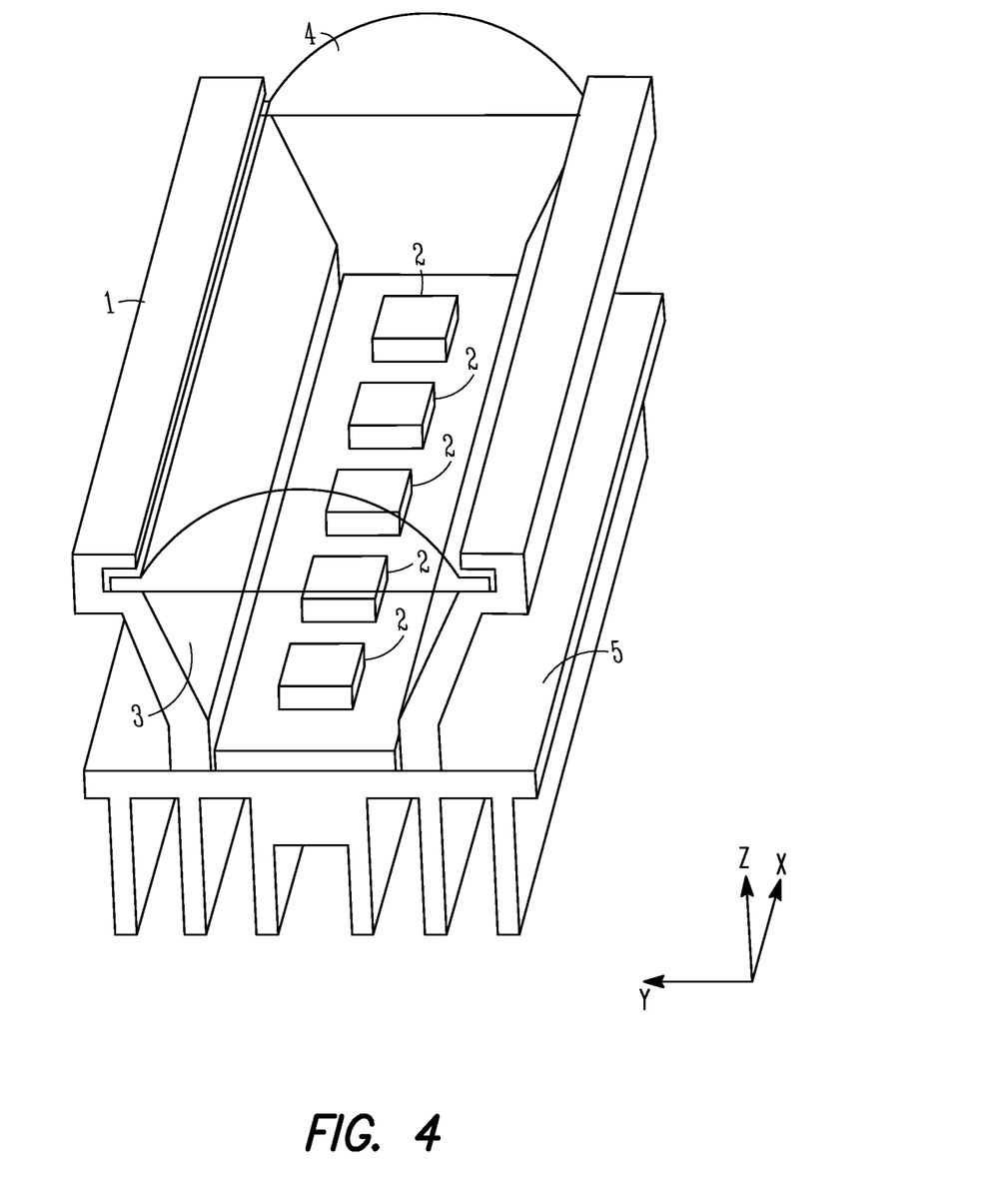
FIG. 4 is a perspective drawing of an exemplary replacement lamp.
Figure 5:
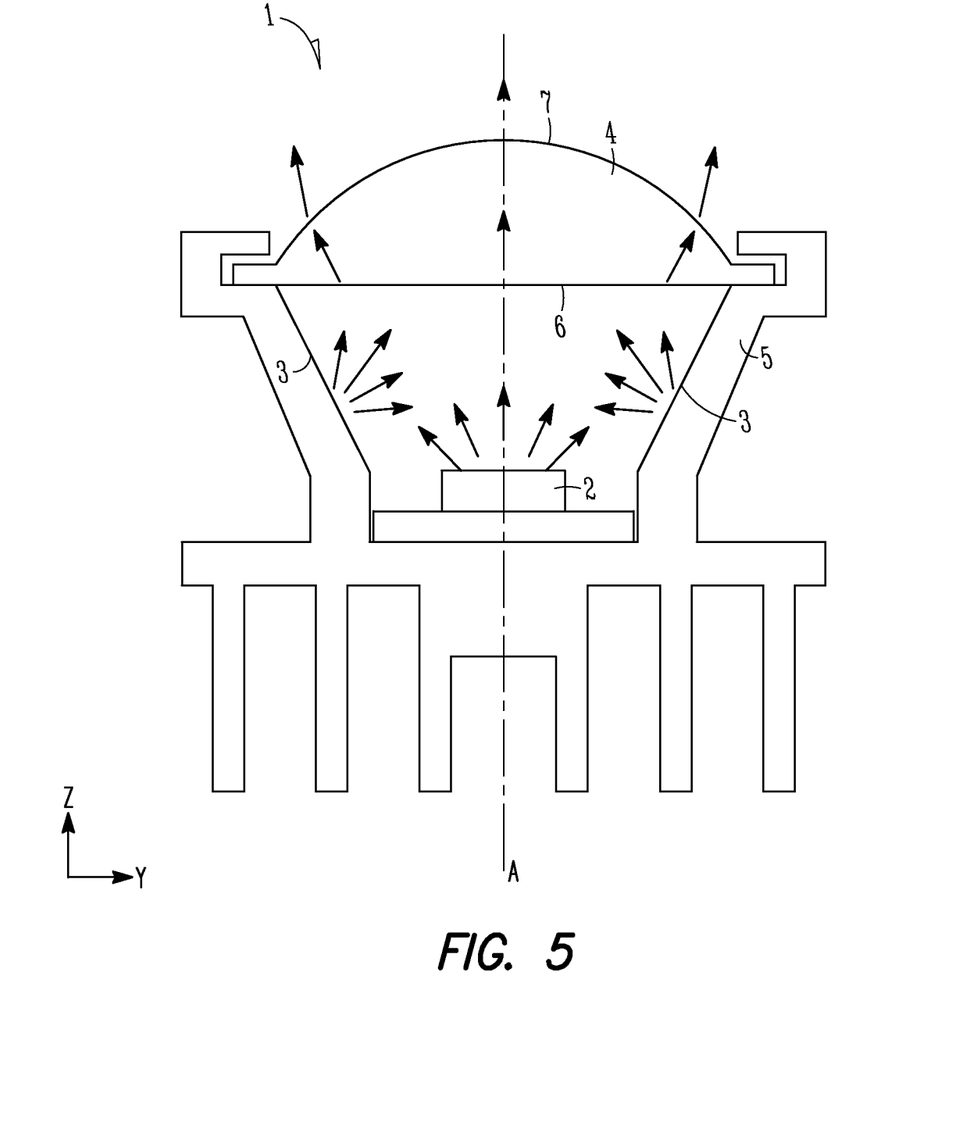
FIG. 5 is a side-view drawing of an exemplary replacement lamp.

FIG. 4 shows a perspective view of the optical components of the lamp 1, while FIG. 5 shows a cross-section of the components of the lamp 1 with some representative light rays.

A heat sink 5 is elongated along the lateral (X) direction. Most or all of the additional elements are attached to or are integral with the heat sink 5.

The heat sink 5 supports a linear array of light emitting diodes (LEDs) 2 that are also distributed along the lateral (X) direction. In some cases the LEDs 2 are evenly distributed. The LEDs 2 emit white light, typically by producing blue or violet light and including a phosphor coated on the LED at the die level within the package that absorbs the blue or violet light and emits light in the yellow portion of the spectrum. The phosphor may be included in or on the epoxy die lens proximate the LED chip within the package, which protects the die from the environment. The combination of the blue or violet source light with the yellow phosphor-emitted light appears white to the human eye. The preferred embodiments described herein function with white light LEDs without making use of a remote phosphor of the type discussed in the "Detailed Description" section of U.S. Pat. No. 7,618,157 (Galvez), in which a remote phosphor is located on an external lens or an external reflector.

Each LED 2 typically has a generally square emission face, and emits light into an angular distribution that is centered around a longitudinal axis (A). The longitudinal axes (A) of all the LEDs 2 are parallel to each other and are generally parallel to the vertical axis (Z). The angular distribution is typically Lambertian, with an intensity that peaks along the longitudinal axis (A), and falls to zero at ninety degrees from the longitudinal axis (A).

The light emitted from the LEDs 2 may be characterized by propagation angle. We define a central portion of the LED light to mean the light propagating along the longitudinal axis (A) and at relatively small propagation angles on either side of the longitudinal axis (A). This central portion leaves the LEDs 2 and directly strikes an incident face 6 of a cylindrical lens 4. We also define a peripheral portion of the LED light to mean the light propagating at relative large propagation angles with respect to the longitudinal axis (A). This peripheral portion leaves the LEDs 2 and directly strikes one of two inclined surfaces 3, which diffusely reflects the light toward the incident face 6 of the cylindrical lens 4. The inclined surfaces 3 are either integral with the heat sink 5 or are made separately and are attached to the heat sink 5.

The inclined surfaces 3 are generally flat, to within reasonable manufacturing tolerances. In other cases, the inclined surfaces 3 may include curvature, and may optionally be convex, concave or may include both convex and concave portions.

The inclined surfaces 3 are diffuse reflectors. As such, the surfaces 3 are rough enough to produce diffuse reflections, rather than specular reflections. For the purposes of this document, a "diffuse" reflection is taken to mean a "non-specular"

reflection. For a specular reflector, light striking the specular reflector at a single angle of incidence is reflected into a single angle of reflection. In contrast, for a diffuse reflector, light striking the diffuse reflector at a single angle of incidence is reflected into a range of reflected angles. The inclined surfaces 3 may be formed with the surface roughness being integral with a molding process, or may alternatively be formed as smooth surfaces that are roughened afterward. One of ordinary skill in the art will be readily familiar with the amount of surface roughening that produces a fully diffuse reflector (light scatters into an angular distribution centered around a surface normal, regardless of the angle of incidence) or a partially diffuse reflector (light scatters into an angular distribution centered around the angle of reflection of a specular reflection).

The orientation of the inclined surfaces 3 may be described as being parallel to a lateral direction (X), and extending from a position at or near a lateral edge of the LEDs 2 to a position at or near a lateral edge of the cylindrical lens 4. The inclined surfaces 3 open outward from the LEDs 2 to the lens 4. The lens 4 is mechanically supported by the heat sink 5.

The light passing through the cylindrical lens 4 is a combination of central light, which leaves the LEDs 2 and directly strikes the incident face 6 of the lens 4, and peripheral light, which leaves the LEDs 2 and reflects diffusely off the inclined surfaces 3. Most or all of this light transmits through the incident face 6 and the exiting face 7 of the lens 4.

The cylindrical lens 4 has optical power in the forward direction (Y) but not in the lateral direction (X). In other words, the cylindrical lens 4 alters the angular path of the transmitted light along the forward direction (Y) but not along the lateral direction (X). In the exemplary configuration shown in the figures, the cylindrical lens 4 is plano-convex, with a generally flat incident side 6. In other configurations, the cylindrical lens 4 may be bi-convex or concave-convex (also known as meniscus).

In the specific configuration shown in the figures, the convex exiting side 7 of the lens 4 is convex across the full surface. In some configurations, the convex exiting side 7 of the lens 4 is flat at the intersection with the longitudinal axis (A). In some other configurations, there may be a slight concave dimple at the intersection with the longitudinal axis (A).

Figure 6:
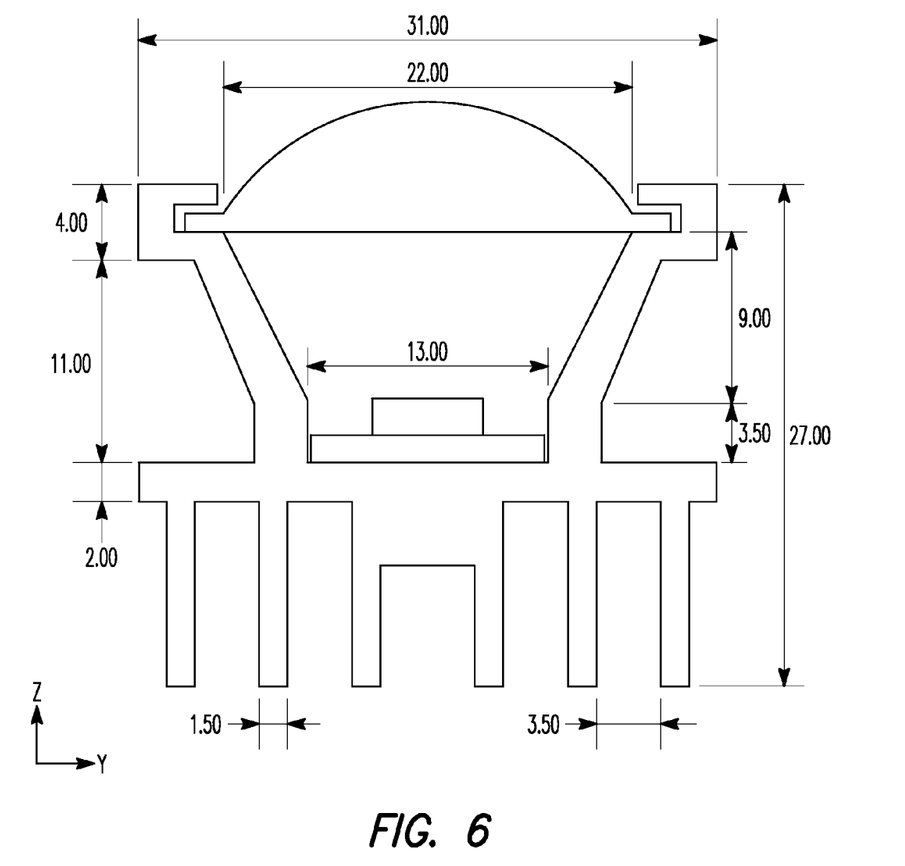
FIG. 6 is a dimensioned side-view drawing of the replacement lamp of FIG. 5.
Figure 7:
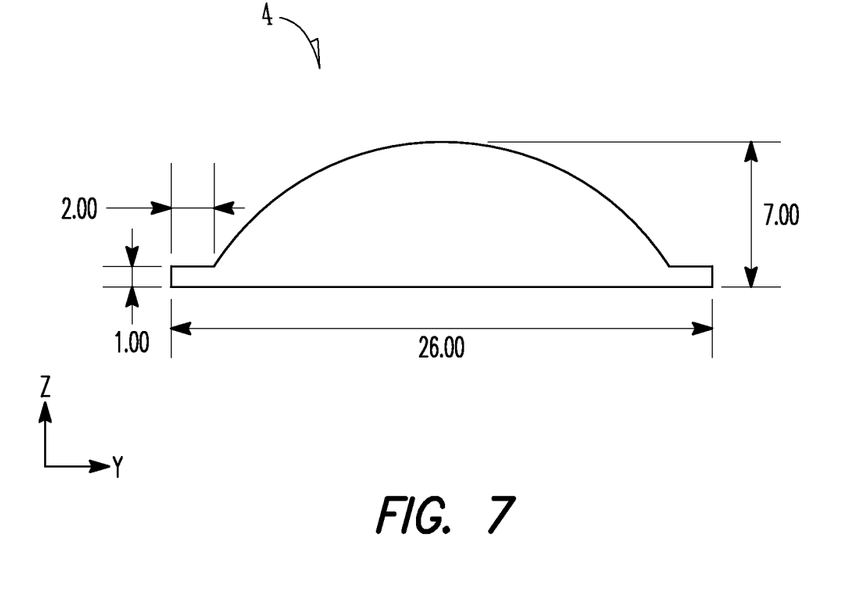
FIG. 7 is a dimensioned side-view drawing of an exemplary cylindrical lens.

FIG. 6 provides dimensions, in mm, for the heat sink 5, lens 4 and LEDs 2 shown in FIG. 5. FIG. 7 provides dimensions, in mm, specifically for the exemplary cylindrical lens 4.

In the example shown in FIG. 7, there is actually a slight concave dimple at the center of the otherwise convex exiting side 7 of the lens, but with a scale too small to be seen in the full-sized figure. In this specific example, the slight concave dimple has points on either side of the longitudinal axis (A) at which the exiting side 7 of the lens 4 extends farthest from the LEDs 2. Each point is located 0.825 mm away from the longitudinal axis (A), and the points are on opposite sides of the longitudinal axis (A).

Note that the front and back faces 11 and the inclined surfaces 3 may have different amounts of diffusivity. For example, in some cases, the inclined surfaces 3 may be relatively gentle diffusers, so that for a given incident angle, the range of reflected angles is relatively small and includes a particular angle that satisfies the condition of incident angle equals reflected angle, both with respect to the surface normal. As a contrasting example, in some cases, the front and back faces 11 may be relatively large diffusers, so that the range of transmitted angles is centered around a surface normal, and is essentially independent of incident angle.

The front and back faces 11 may be translucent or frosted, and may diffuse light transmitted through the faces 11 so that regardless of the angle of incidence, the transmitted light has an angular distribution that is generally invariant over the full front and back faces 11. In other words, to a pilot, the brightness of the sign does not significantly vary across the area of the sign if the front and back faces 11 are sufficiently diffusive and the power incident on the front and back faces 11 is sufficiently uniform. These properties of the front and back faces 11 are well-known to one of ordinary skill in the art.

Note also that the diffusive properties described above are properties of the front and back faces 11 themselves, and are not ascribed to any diffuser (e.g., 130, 132) within the interior of the sign or adjacent to the LED lamp 1. In some cases, the front and back faces 11 are formed as volume diffusers, with diffusing properties built into the glass or plastic that forms the faces 11. In other cases, the faces 11 have one or more roughened surfaces that diffuse the light. In still other cases, the faces 11 have a diffusive film attached to one or both surfaces. In all of these cases, it is the faces 11 themselves that diffuse the light, not any interior element within the sign. Note that the diffusers 130, 132 shown in the existing sign 100 of FIG. 8 are to be removed as part of a retrofit with the single LED lamp 1, and do not remain in the sign.

In some cases, the front and back faces 11 of the runway sign 10 are formed from colored plastic, such as white plastic or yellow plastic. In many of these cases, the white or yellow coloring is a coating formed integrally on the inner-facing side of the front or rear faces 11 of the runway sign 10. The coating may function as a diffuser that promotes uniformity in the light output of the sign 10.

In many existing signs, the bottom edge 16 of the runway sign 10 is a reflective panel or prism refractor. Such a reflective panel or prism refractor was particularly useful for the fluorescent or incandescent lamps, which directed a significant amount of light onto the bottom edge 16 of the sign 10. For the LED lamp designs considered herein, typically about 80% of the LED light is directed to the front or rear faces 11 of the sign 10, with only about 20% being directed to the bottom edge 16 of the sign 10. Because the LED lamp directs much less light to the bottom edge 16, compared with the original equipment lamps, the reflectivity of the bottom edge 16 becomes much less important for the function of the lamp. With the LED lamp discussed herein, the reflective panel or prism refractor may be removed without perceptibly degrading the brightness of the sign 10.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

GLOSSARY

A Non-Limiting Summary of Above Reference Numerals

1 replacement lamp
2 LEDs
3 inclined surfaces
4 lens
5 heat sink
6 incident face of lens
7 exiting face of lens 10 runway sign
11 viewable faces of runway sign
12, 13, 14, 15 increasingly distal regions of viewable faces
16 bottom edge of runway sign
17 top edge of runway sign
21 statistical simulation curve
22 formula curve
100 sign
102 case
130 diffuser
132 diffuser
A longitudinal axis
Q angle of propagation
X lateral direction
Y forward direction
Z vertical direction

What is claimed is:

1. A two-sided airport runway sign (10), comprising:
a rectangular, translucent front face (11),
a rectangular, translucent rear face (11) generally parallel to the front face (11) and longitudinally separated from the front face (11) by first and second longitudinal edges (17, 16), the front and rear faces (11) and the first and second longitudinal edges (17, 16) bounding an interior volume of the runway sign (10); and
a single LED lamp (1) being electrically energized in operational use, the LED lamp (1) being disposed proximate the first longitudinal edge (17) of the interior volume, the LED lamp (1) being selectively removable from and replaceable into the runway sign (10), the LED lamp (1) having a plurality of spaced LEDs (2);
wherein the energized LED lamp (1) provides direct illumination to both the front and rear faces (11) simultaneously along a direct optical path between the lamp (1) and the front and rear faces (11) that is unobstructed by interaction with any further optical element; and
wherein the interior volume that is spaced away from both said single LED lamp (1) and said front and rear faces (11) is devoid of a diffuser (130) optically adjacent the LED lamp (1).

2. The sign (10) of claim 1, wherein the LED lamp (1) comprises a linear array of LEDs (2).

3. The sign (10) of claim 2, wherein the LEDs (2) are spaced along a line parallel to an intersection of the first longitudinal edge (17) with the front face (11).

4. The sign (10) of claim 2, wherein the LED lamp (1) further comprises a cylindrical lens (4) that receives light emitted from the LEDs (2) and produces a light output having angular peaks on opposite sides of a longitudinal axis (A) of the LED lamp (1).

5. The sign (10) of claim 2, wherein the LED lamp (1) further comprises a cylindrical lens (4) that receives a central portion of light emitted from the LEDs (2).

6. The sign (10) of claim 5, wherein the LED lamp (1) further comprises a pair of inclined reflecting surfaces (3) extending from a position proximate an outer edge of the LEDs (2) to a position proximate an outer edge of the cylindrical lens (4).

7. The sign (10) of claim 6, wherein the inclined reflecting surfaces (3) reflect a peripheral portion of the light emitted from the LEDs (2) toward the cylindrical lens (4).

8. The sign (10) of claim 7, wherein the cylindrical lens (4) transmits the central portion and the reflected peripheral portion to form a light output.

9. The sign (10) of claim 8, wherein the light output comprises a power per unit angle exiting the LED lamp (1) that has peaks at the front and rear faces (11) at locations proximate the second longitudinal edge (16) of the runway sign (10), the second longitudinal edge (16) being opposite the first longitudinal edge (17).

10. The sign (10) of claim 9, wherein the light output that misses the front and rear faces (11) and strikes a second longitudinal edge (16) of the runway sign (10) is less than the peaks.

11. The sign (10) of claim 6, wherein the LEDs (2) are white-light LEDs.

12. The sign (10) of claim 6, wherein the inclined reflecting surfaces (3) and the cylindrical lens (4) are devoid of wavelength conversion material.

13. The sign (10) of claim 6, wherein the reflecting surfaces (3) are flat and diffusely reflecting.

14. The sign (10) of claim 1, wherein the illumination comprises a uniform incident power per area on the front and rear faces (11).

15. The sign (10) of claim 1, wherein
the interior volume is devoid of a diffuser (130) that is at least partially light transmissive; and
the LED lamp (1) further comprises a pair of inclined reflecting surfaces (3) extending away from a position proximate an outer edge of the LEDs (2), said inclined reflecting surfaces (3) opening further away from each other at positions more remote from the LEDs (2), said reflecting surfaces (3) being flat and diffusely reflecting.

16. A two-sided airport runway sign (10), comprising:
a rectangular, translucent front face (11),
a rectangular, translucent rear face (11) generally parallel to the front face (11) and longitudinally separated from the front face (11) by first and second longitudinal edges (17, 16), the front and rear faces (11) and the first and second longitudinal edges (17, 16) bounding an interior volume of the runway sign (10); and
a single LED lamp (1) being electrically energized in operational use, the LED lamp (1) being disposed proximate the first longitudinal edge (17) of the interior volume, the LED lamp (1) being selectively removable from and replaceable into the runway sign (10), the LED lamp (1) having a plurality of spaced LEDs (2) and a lens (4) that receives a central portion of light emitted from the LEDs (2);
wherein light emitted from said lens (4) from the energized LED lamp (1) provides direct illumination to both the front and rear faces (11) simultaneously along a direct optical path between the lens (4) and the front and rear faces (11) that is unobstructed by interaction with any further optical element.

17. The sign (10) of claim 16, wherein the lens (4) is a cylindrical lens that receives light emitted from the LEDs (2) and produces a light output having angular peaks on opposite sides of a longitudinal axis (A) of the LED lamp (1).

18. The sign (10) of claim 16, wherein the LED lamp (1) further comprises a pair of inclined reflecting surfaces (3) extending from a position proximate an outer edge of the LEDs (2) to a position proximate an outer edge of the lens (4).

19. The sign (10) of claim 18, wherein the light output comprises a power per unit angle exiting the LED lamp (1) that has peaks at the front and rear faces (11) at locations proximate the second longitudinal edge (16) of the runway sign (10), the second longitudinal edge (16) being opposite the first longitudinal edge (17).

* * * * *